United States Patent
Quiroz

(10) Patent No.: US 6,647,188 B2
(45) Date of Patent: Nov. 11, 2003

(54) OPTICAL FIBER CABLE

(75) Inventor: David Quiroz, Covina, CA (US)

(73) Assignee: Hon Hai Precision Ind, Co., Ltd., Taipei Hsien (TW)

(*) Notice: Subject to any disclaimer, the term of this patent is extended or adjusted under 35 U.S.C. 154(b) by 0 days.

(21) Appl. No.: 09/922,014

(22) Filed: Aug. 2, 2001

(65) Prior Publication Data

US 2003/0026560 A1 Feb. 6, 2003

(51) Int. Cl.[7] .................................................. G02B 6/44
(52) U.S. Cl. .................................................... 385/114
(58) Field of Search ................................. 385/107, 114, 385/113, 103

(56) References Cited

U.S. PATENT DOCUMENTS 5,611,017 A * 3/1997 Lee et al. .................. 385/114
6,449,412 B1 * 9/2002 Rutterman et al. ......... 385/103

* cited by examiner

Primary Examiner—Khiem Nguyen
(74) Attorney, Agent, or Firm—Wei Te Chung

(57) ABSTRACT

An optical fiber ribbon assembly (2, 3) of the present invention includes a plurality of aligned optical fibers (27) and a laminated structure surrounding the optical fibers. The laminated structure includes a clear polyvinyl chloride (PVC) extrusion layer (22) bonding the fibers together and a pair of Kapton layers (21) laminated over the PVC extrusion layer. Additional KEVLAR members (34) may be aligned with the fibers and embedded in the PVC extrusion layer and the Kapton layers, thereby providing the fibers with additional protection from tensile loads.

14 Claims, 2 Drawing Sheets

OPTICAL FIBER CABLE

BACKGROUND OF THE INVENTION

1. Field of the Invention

The present invention relates to an optical fiber cable, and particularly to an optical fiber ribbon cable with a laminated structure.

2. Description of Related Art

Optical fibers are now used in a variety of telecommunication applications because of small physical size and high bandwidth capacity. An optical fiber cable typically contains a number of individual optical fibers. Different configurations of optical fibers in the cables leads to a variety of cable types, including loose-tube cables, tight-buffered cables, and optical fiber ribbons.

It is not uncommon for an optical fiber cable containing one or more optical fibers to undergo rough handling or to be exposed to a physical environment that stresses or crushes the fiber or fibers within the cable. For example, an optical fiber contained within an optical fiber cable can experience stress and strain when the cable is bended or stretched during winding on a reel for purposes of storage. An optical fiber cable pinched between other cable components may be subject to mechanical stresses due to differences in coefficients of thermal expansion between the optical fiber and the other components of the cable, such as a tube containing the fiber, or protective layers inside an optical fiber ribbon cable.

A variety of techniques have been developed to hold and protect individual fibers from damage. For example, fibers are frequently encased in a jacket or other protective material. In addition, individual fibers are often grouped together to provide a cable capable of carrying increased amounts of information.

Cylindrical optical fiber cables usually employ additional protective layers to relieve stochastic strain, stress, crush loading, impact, or abrasive forces exerted thereon. These protective layers commonly include buffer tubes/layers, strength members, filler members in loose-tube type cables, and thick jackets made of polyvinyl chloride (PVC) or other appropriate materials.

However, in the case of ribbon type optical fiber cables, some of the more ordinary protective means, such as filler members used in the cylindrical optical fiber cables become unfeasible. Instead, other protective elements, such as buffers or strength members, can be applied around individual optical fibers contained in a ribbon cable.

Individual optical fibers have been woven into sheets, aiming to provide a workable solution to the above-discussed problems. For example, as disclosed in U.S. Pat. Nos. 5,524,679, 5,469,895, 5,280,558 and 5,256,468, optical fibers have been woven into a supporting structure. Once completed, the woven, grid-like mat can be coated with various types of protective material, such as an elastomer or a rubber epoxy, to form a flexible sheet with the optical fibers embedded therein. Alternatively, the structure can be coated or embedded in a rigid material, such as epoxy, to form a hard or rigid, grid-like structure.

Although such flexible or rigid, grid-like mat structures can achieve good tensile resistance, they unavoidably result in a highly complicated manufacture with attendant high costs. Moreover, such a solution does not work well to resist impact, crush and abrasion.

Another related prior art for solving the above-discussed problems is disclosed in U.S. Pat. No. 4,679,897, as shown in FIG. 3. An optical fiber ribbon cable combination 1 includes a pair of plastic tapes 14, a ribbon 10 consisting of a plurality of optical fibers 15, and a pair of plastic insulated copper conductors 12. The ribbon 10 is disposed between the conductors 12 and the conductors 12 extend lengthwise of the tape along with the ribbon 10. The ribbon 10 and the conductors 12 are sandwiched between the tapes 14. The ribbon 10 is loosely housed within an elongate compartment defined by the conductors 12 and the tapes 14. When a tensile force is applied to the cable combination 1, the conductors 12 and the tape 14 help carrying the tensile load, sparing the ribbon 10 from carrying the whole tensile load.

However, the conductors 12 can be easily disconnected from the tapes 14 under the tensile force applied thereon since the conductors 12 are only attached to the tapes 14 by fusion bonding. Furthermore, since the ribbon 10 is loosely housed in the compartment between the conductors 12, the ribbon 10 is apt to slide out of the cable assembly 1 when the conductors 12 are disconnected from the tapes 14, thereby exposing the ribbon 10 and its optical fibers 15 to serious damage.

BRIEF SUMMARY OF THE INVENTION

A main object of the present invention is to provide a low-cost, flexible fiber ribbon cable having good resistance against crushing, impact, abrasion and tensile loads.

An optical fiber ribbon assembly in accordance with one aspect of the present invention, comprises a plurality of aligned optical fibers and a laminated structure surrounding the optical fibers. The laminated structure comprises a clear polyvinyl chloride (PVC) extrusion layer bonding the fibers together and a pair of Kapton layers enclosing the PVC extrusion layer. An aramid laminate may substitute the Kapton layers to provide flexible protection to the subassembly of the PVC extrusion layer and the optical fibers. Additional KEVLAR members may be aligned with the fibers and may also be embedded in the PVC extrusion layer and the laminated Kapton layers, thereby providing the fibers with additional protection from outside tensile loads.

DETAILED DESCRIPTION OF THE INVENTION

Figure 1:
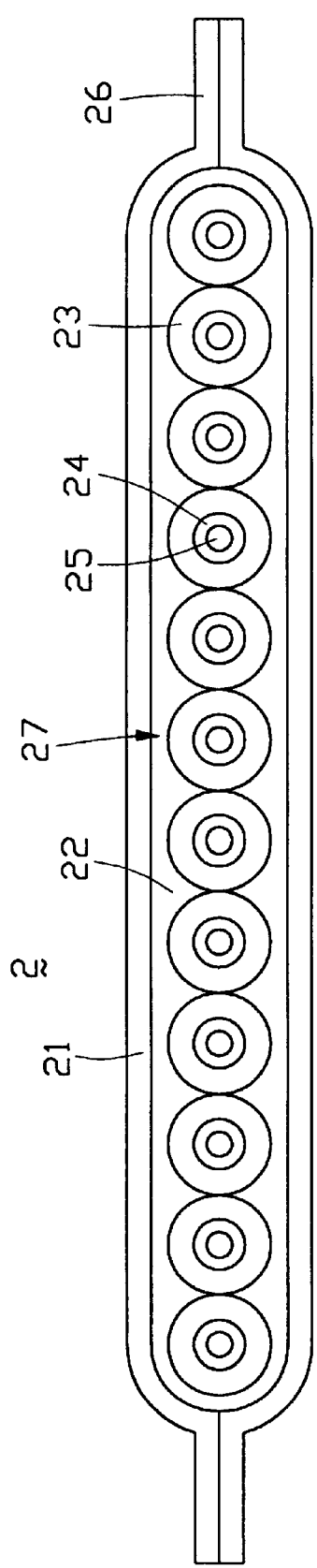
FIG. 1 is a cross-sectional schematic view of a fiber ribbon cable in accordance with a first embodiment of the present invention.

As shown in FIG. 1, an optical fiber ribbon assembly 2 in accordance with a first embodiment of the present invention comprises a plurality of parallel optical fibers 27 aligned in a plane and a laminated structure (not labeled) surrounding the optical fibers 27. Each fiber 27 include a core 25 surrounded by a cladding 24, which is in turn surrounded by a coating 23. The laminated structure comprises a clear polyvinyl chloride (PVC) extrusion layer 22 bonding the fibers 27 together and a pair of Kapton layers 21 laminated over the PVC extrusion layer 22. The PVC extrusion layer 22 and the fibers 27 form a subassembly (not labeled). A flange 26 extends from opposite side edges of each Kapton layer 21. The Kapton layers 21 may be substituted with an aramid laminate to provide flexible protection to the subassembly.

The PVC layer 22 provides protection against impact and increases crush resistance of the optical fibers 27. The Kapton layers 21 further provide protection against abrasion and high temperatures, and also increases tensile strength of the whole ribbon assembly 2. Moreover, neither the PVC extrusion layer 22 nor the laminated Kapton layer 21 is expensive. Therefore, the fiber ribbon assembly 2 of the present invention gains good performance against impact, crushing, abrasion and tensile loads with a moderate increase in cost.

Figure 2:
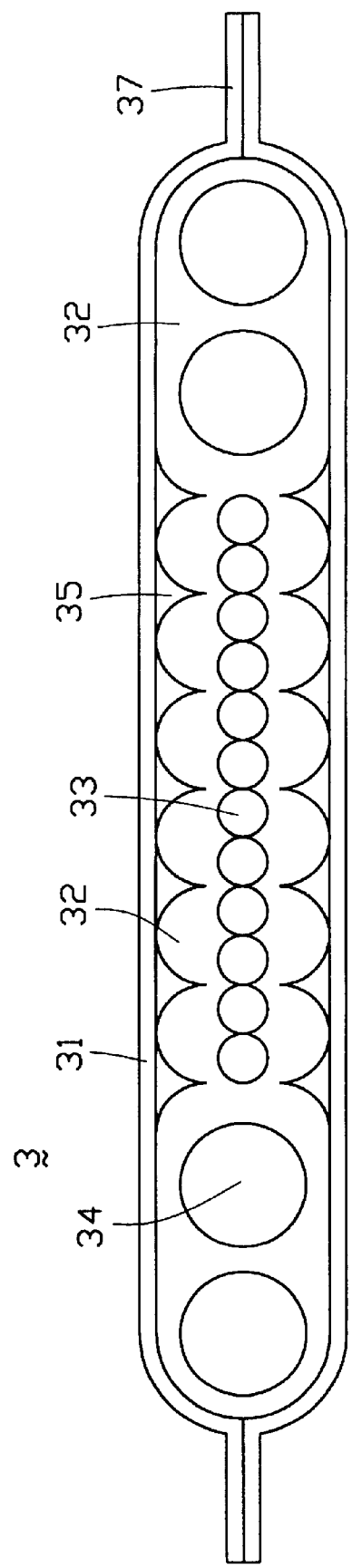
FIG. 2 is a cross-sectional schematic view of a fiber ribbon cable in accordance with a second embodiment of the present invention.
Figure 3:
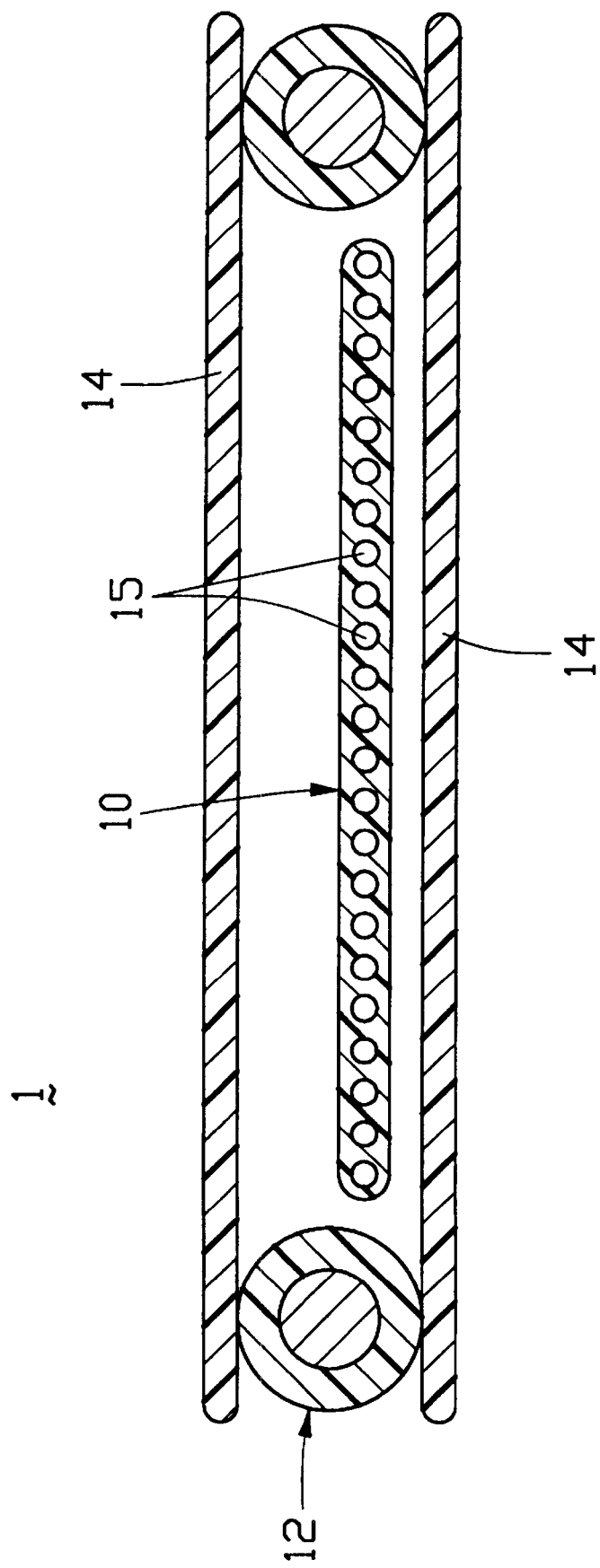
FIG. 3 is a cross-sectional schematic view of a conventional flat fiber cable.

In a second embodiment of the present invention, shown in FIG. 2, a fiber ribbon assembly 3 comprises a plurality of parallel optical fibers 33 aligned in a plane and a laminated structure (not labeled). The laminated structure similarly includes a PVC extrusion layer 32 bonding the fibers together, and a Kapton layer 31 enclosing the subassembly of the PVC extrusion layer 32 and the fibers 33. A pair of notches 35 is defined between adjacent pairs of the fibers 33.

Additional KEVLAR members 34 are aligned with and are coplanar with the fibers 33 and are also embedded in the PVC extrusion layer 32. The KEVLAR members 34 provide the fiber ribbon assembly 3 with additional protection from tensile loads.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber ribbon assembly comprising:
   a plurality of parallel optical fibers;
   an inner protection layer extruded to bond the fibers together thereby forming a subassembly; and
   a pair of outer protection layers laminated over and enclosing the subassembly; wherein
      at least a KEVLAR member is positioned on each of two opposite sides of the optical fibers, the KEVLAR members being parallel with and coplanar with the optical fibers; wherein
      the KEVLAR members are embedded in the inner protection layer together with the fibers.

2. The optical fiber ribbon assembly as claimed in claim 1, wherein each fiber comprises a core, a cladding layer surrounding the core and a coating layer surrounding the cladding layer.

3. The optical fiber ribbon assembly as claimed in claim 1, wherein a flange extends from opposite sides of each outer protection layer.

4. The optical fiber ribbon assembly as claimed in claim 1, wherein at least a notch is defined between adjacent pairs of the aligned fibers.

5. The optical fiber ribbon assembly as claimed in claim 1, wherein the outer protection layer is made of Kapton.

6. The optical fiber ribbon assembly as claimed in claim 1, wherein the outer protection layer is made of aramid.

7. The optical fiber ribbon assembly as claimed in claim 1, wherein the inner protection layer is made of polyvinyl chloride.

8. An optical fiber ribbon assembly comprising:
   a plurality of aligned optical fibers;
   an inner protection layer extruded to bond the fibers together thereby forming a subassembly; and
   a pair of outer protection layers laminated over and enclosing the subassembly; wherein
      at least a KEVLAR member is positioned on each of two opposite sides of the optical fibers, the KEVLAR members being parallel with and coplanar with the optical fibers; wherein
      the KEVLAR members are embedded in the inner protection layer together with the fibers.

9. The optical fiber ribbon assembly as claimed in claim 8, wherein each fiber comprises a core, a cladding layer surrounding the core and a coating layer surrounding the cladding layer.

10. The optical fiber ribbon assembly as claimed in claim 8, wherein a flange extends from opposite sides of each outer protection layer.

11. The optical fiber ribbon assembly as claimed in claim 8, wherein at least a notch is defined between adjacent pairs of the fibers.

12. The optical fiber ribbon assembly as claimed in claim 8, wherein the outer protection layers are made of Kapton.

13. The optical fiber ribbon as claimed in claim 8, wherein the outer protection layers are made of aramid.

14. The optical fiber ribbon assembly as claimed in claim 8, wherein the inner protection layer is made of polyvinyl chloride.

* * * * *